United States Patent
Cash, III et al.

(10) Patent No.: US 7,407,052 B2
(45) Date of Patent: Aug. 5, 2008

(54) STABILIZED GUIDED CONVEYOR BELT WITH MULTIPLE BASE CHAINS AND INTERCHANGEABLE CONVEYOR PLATES

(75) Inventors: John W. Cash, III, Dallas, GA (US); Michael F. Flagg, Newnan, GA (US); Larry D. Chuba, Akron, OH (US)

(73) Assignee: Mead Westvaco Packaging Systems, LLC, Glen Allen, VA (US)

( * ) Notice: Subject to any disclaimer, the term of this patent is extended or adjusted under 35 U.S.C. 154(b) by 15 days.

(21) Appl. No.: 11/380,144

(22) Filed: Apr. 25, 2006

(65) Prior Publication Data

US 2006/0254886 A1 Nov. 16, 2006

Related U.S. Application Data

(60) Provisional application No. 60/676,458, filed on Apr. 29, 2005.

(51) Int. Cl.
*B65G 15/10* (2006.01)
*B65G 17/42* (2006.01)

(52) U.S. Cl. ............... 198/849; 198/851; 198/698

(58) Field of Classification Search ............... 198/849, 198/851, 698
See application file for complete search history.

(56) References Cited

U.S. PATENT DOCUMENTS

| | | | |
|---|---|---|---|
| 2,954,113 A * | 9/1960 | Hibbard et al. | 198/867.15 |
| 3,669,247 A * | 6/1972 | Pulver | 198/841 |
| 3,759,458 A * | 9/1973 | Thomas | 242/540 |
| 3,842,968 A | 10/1974 | Owens | |
| 4,096,943 A | 6/1978 | Gentsch | |
| 4,301,915 A | 11/1981 | Michalik et al. | |
| 5,042,244 A * | 8/1991 | Worsley | 59/78 |
| 5,337,887 A | 8/1994 | Greenwell et al. | |
| 5,429,226 A | 7/1995 | Ensch et al. | |
| 6,209,716 B1 | 4/2001 | Bogle et al. | |
| 6,772,876 B2 * | 8/2004 | Spangenberg | 198/867.02 |
| 6,851,549 B1 * | 2/2005 | Beringer | 198/867.15 |
| 6,945,387 B1 * | 9/2005 | Christensen | 198/835 |
| 6,945,388 B2 * | 9/2005 | Schumacher | 198/851 |

\* cited by examiner

*Primary Examiner*—Mark A Deuble
(74) *Attorney, Agent, or Firm*—Parks Knowlton LLC; Karen L. Ware, Esq.

(57) ABSTRACT

A stabilized and guided conveyor belt (202) includes multiple transport chains (108) and interchangeable conveyor plates (100) that form the surface of the conveyor belt (202). The conveyor plates (100) can be easily attached independently of one another in a side by side fashion onto the transport chains (108) and are readily detachable from the transport chains (108) to facilitate replacement or rearrangement. Certain of the plates (100) function selectively as a platform on which to mount accessories such as lug members (136) and include means for receiving (134) accessories and for locking (138) accessories into place. The conveyor belt (202) is guided and supported by a smooth rail (420). Both the plate (100) and the rail (420) include interacting stabilizing features (130, 132, 424*a*, 424*b*) that cooperate to prevent buckling and rippling of the transport chain (108).

22 Claims, 5 Drawing Sheets

STABILIZED GUIDED CONVEYOR BELT WITH MULTIPLE BASE CHAINS AND INTERCHANGEABLE CONVEYOR PLATES

CROSS REFERENCE TO RELATED APPLICATIONS

This application claims priority to U.S. application Ser. No. 60/676,458, filed Apr. 29, 2005, the entirety of which is incorporated herein by reference.

TECHNICAL FIELD

The invention relates to a conveying apparatus, and more particularly, to a stabilized and guided conveyor belt with multiple base chains and interchangeable conveyor plates.

BACKGROUND OF THE INVENTION

Articulated roller chain conveyors are commonly used in packaging applications to convey articles such as bottles or cans through a packaging machine to be loaded into paperboard cartons. It is often the practice to attach plates to the roller chain or to interlock plates to provide a smooth surface upon which the articles and/or cartons are conveyed. It is important to prevent the conveyor surface from tilting, buckling, or excessively undulating, which topples articles, interferes with other packaging machine components such as lane dividers, damages carton flaps, or otherwise causes misfeeds. This problem is exacerbated when accessories such as lugs are mounted to the plates to facilitate grouping or metering of articles. Each lug extends outward with respect to the surface of the plate to which it is mounted and increases the tendency of the plate to rotate about its longitudinal access (i.e., the lug increases the moment of the plate about a horizontal axis parallel to the direction of flow). Prior art lugs commonly shear off when exposed to these forces, as the lugs are often secured by two screws or pins disposed through the surface of the plate. The pins concentrate the reaction loads in singular areas of the plastic chain top, and thus, have the tendency to snap causing the lug to disengage. Such failures are costly, as the affected plate must be replaced or the broken screw or pins removed to mount another lug. It is desirable, therefore, to have plates that resist this moment and provide a stable surface regardless of whether accessories are mounted.

One prior approach that has been taken to reduce tilting, buckling, or excessive undulation of packaging machine conveyors involves running the transport chain under relatively high tension. This approach disadvantageously exposes the transport chain to increased wear and to elongation over time, particularly, as the transport chains are commonly constructed using links formed from plastic that are interlocked with steel pins.

Transport chains also typically comprise a single base chain disposed centrally with respect to the surface of the conveyor belt. Such single chain arrangements provide little resistance to rotational forces, and are more susceptible to stretching and other damage that can be caused by such forces as well as by typical operating conditions.

What is needed is a conveyor belt having a substantially flat, stable surface that resists tilting, buckling, and excessive motion. There is also a need for a durable transport chain that contributes to the stability of the conveyor belt without diminishing the efficiency of the machine. What is further needed is a conveyor plate upon which a grouping lug or other member can be securely mounted, and that is easily detachable for replacement or repair, or to reconfigure the conveyor belt.

SUMMARY OF THE INVENTION

The various embodiments of the present invention address the shortcomings in the prior art by providing a guided conveyor belt that is driven by a transport chain that utilizes dual steel base chains. The improved conveyor belt offers a smooth, substantially flat surface for conveying articles. Generally described, the surface of the conveyor belt is formed from multiple conveyor plates that can be easily attached independently of one another in a side by side fashion onto the transport chain and are readily detachable from the transport chain for replacement, repair, or reordering. The plates function selectively as a platform on which to mount accessories such as lugs and include means for receiving accessories and for locking accessories into place. The conveyor belt is guided and supported by a smooth rail. Both the belt and the rail include interacting stabilizing features that cooperate to prevent buckling and rippling of the conveyor belt, which also reduces stretching and other damage to the transport chain.

More specifically, each plate is preferably preformed of a somewhat elastically deformable material such as a plastic or other polymer. In the exemplary embodiments, plastic is injection molded to form the unitary structure of each plate, although any suitable means of manufacture that yields the structural and functional elements described herein will serve the objects of the invention. Suitable means of manufacture include, for example, alternative methods for manufacturing unitary plates such as thermoforming, pressure forming, low pressure foam molding, and vacuum forming. In alternative embodiments, the plate is formed from several components that may be different materials. For example, at least the upper surface of each plate may be formed from steel with the remainder of the plate being plastic. Accordingly, suitable means for manufacture also include twin sheeting or other methods for manufacturing and assembling plate structures formed from several components which are secured together using securing means such as adhesives and welds. A unitary structure is preferred in certain applications, however, to drastically reduce the cost of the plate and to increase part consistency.

The exemplary plate is configured as an attachment to be attached to an exemplary transport chain having dual base chains that translate power from a drive system. Each of the two base chains includes multiple links crafted from steel or a similarly strong and durable material. The links of each base chain are connected by hinge pins that protrude somewhat on either side of the links. In other embodiments, the transport chain includes more than two base chains.

The exemplary plate includes a body having a substantially flat top surface that is substantially rectangular in shape. The plate has side edges, end edges, and an underside from which an inside tab, an outside tab, and two central tabs extend. In alternative embodiments, such as where base chains are closely positioned, a single central tab extends from the underside of the plate.

According to one aspect of the invention, the tabs extending from the underside of each plate are configured to snap onto the dual base chains, and extend over the protruding portions of the hinge pins. The tabs include apertures through which the protruding portions of the hinge pins extend when the plate is attached to the dual base chains. Preferably, multiple plates are thereby secured to the transport chain with their sides disposed in relatively close proximity to one another and transversely with respect to the direction of travel. Thereby, the plates form a substantially continuous and flat conveyor belt on which the articles are conveyed.

According to another aspect of the invention, the conveyor belt, which includes at least in part the combination of the transport chain and the plates, is supported by and travels along a smooth rail. Specifically, the rail guides the conveyor belt along a predefined path. The conveyor belt includes means for stabilizing each of the conveyor plates. The stabilizing means stabilizes the conveyor belt by limiting the movement of the conveyor belt with respect to the fixed rail. The exemplary conveyor belt has an outside edge and an inside edge, but is continuous, comprising an endless series of plates attached to an endless transport chain, although any suitable conveying configuration is contemplated, including a reversible belt having opposing ends. In the exemplary embodiments, a portion of each plate extends beyond the outside edge of the other components of the conveyor belt.

The stabilizing means includes a guide extending at an angle from both the inside tab and the outside tab. The guides extend outward toward the end edges of the plate so as to engage the edge of a flange extending from the rail. The guides prevent buckling and tilting of the belt along its length and width by restricting back and forth and side to side motion by further limiting the moment of the mounting plate even when the lug experiences cantilevered forces.

The use of multiple base chains is an important aspect of the invention, increasing the effectiveness of the support and stabilization features of the conveyor belt and rail. More specifically, the dual base chains of the exemplary embodiments are spaced apart, allowing the guides, outermost tabs, and sides of the rail to be spaced further apart, thereby decreasing the impact of moments and other forces caused by cantilevered loads on the conveyor surface. Each plate is stabilized indirectly against the moment about its transverse axis, which is parallel to the direction of machine flow, that tends to cause the belt to twist along its length. Further, each plate is stabilized directly against the moment about its longitudinal axis, which is perpendicular to the direction of travel, that tends to cause the belt to buckle. Thus, excessive and uneven wear and drag on the tabs, guides, and hinge pins is prevented, as is instability of the conveyor belt surface.

According to still another aspect of the invention, a portion of the underside or bottom surface of the body of each plate is substantially thinner and tapers in the direction of the outside edge of the conveyor belt. The slope of the bottom surface of the tapered portion defines an acute angle relative to the top surface of the tapered portion. The taper may be gradual or stepped. This tapering maximizes the thickness and strength of the nontapered portion of the conveyor belt, while providing a ledge over which articles slide into a carton and under which end flaps of cartons can pass. The tapered portion is flexible enough to maintain a degree of pressure on the carton flap below, where the pressure is generated by the articles resting on the upward facing surface of the tapered portion. In alternative embodiments, the taper is abrupt such that the tapered portion has a relatively uniform thickness, which is substantially less than the thickness of the rest of the body of the plate. Thus, as used herein, the word taper is expansively defined as to make thinner or narrower at one end or at both ends.

In certain embodiments, ribs are disposed on the underside of each plate to reinforce the plate so that the plate resists deformation caused by the weight of articles conveyed on the conveyor belt. Providing ribs rather than a thick dense plate achieves the objective of substantial rigidity while minimizing the material required for its construction. The reinforcing ribs preferably do not extend onto the tapered portion for at least the following two reasons. First, it is desirable for the tapered end of the plate to be somewhat flexible so that the plate can accommodate cartons having end flaps of different calipers. Second, ribs disposed on the surface of the relatively thin tapered portion of the plate would tend to cause the tapered portion to curl toward the underside of the plate, compromising the objective of a uniformly straight and flat conveying surface.

As mentioned above, the invention contemplates at least two types of plates—a blank plate for providing a conveyor surface, and a mounting plate that additionally receives one or more accessories that can be mounted thereon. The mounting plate includes a longitudinally disposed groove, its cross-section having a shape that is conducive to interlocking with a tongue having a complementary shape. As examples, the cross-section of the groove may be T-shaped, wedge-shaped, or L-shaped. The groove is configured to accept an accessory such as a lug that can be spaced apart from another lug mounted on another mounting plate, so as to meter articles such as bottles into groups of a predefined number. When mounted, the lugs are disposed transversely with respect to the direction of travel. Each lug includes a tongue having dimensions that provide a mating and interlocking fit as the tongue is guided into the groove.

The plates are attached to the transport chain independently of one another, such that the plates are not interlocked. Rather, the links of the base chains are interlocked preferably via the hinge pins, and the plates are then attached to the hinge pins. Independent attachment facilitates detaching and reordering of the plates to accommodate various grouping arrangements, carton sizes, packaging speeds, and other demands of the particular application in which the plates are used.

According to yet another aspect of the invention, means for receiving an accessory are provided so that the accessory can be coupled with the mounting plate. In the exemplary embodiments, means for receiving an accessory include the groove described above. The invention also provides means for locking or securing the accessory in place. In the exemplary embodiments, each lug is secured via a spring-loaded detent that is received in an aperture or depression disposed on the surface of the mounting plate. Lugs can be quickly installed or removed, but are less likely to shear off, because forces are distributed along the entire groove.

The foregoing has broadly outlined some of the aspects and features of the present invention, which should be construed to be merely illustrative of various potential applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION

As required, detailed embodiments of the present invention are disclosed herein. It will be understood that the disclosed embodiments are merely examples to illustrate aspects of the invention that may be embodied in various and alternative forms. The figures are not necessarily to scale, and some features may be exaggerated or minimized to show details of particular components. In other instances, well-known materials or methods have not been described in detail to avoid obscuring the present invention. Therefore, specific structural and functional details disclosed herein are not to be interpreted as limiting, but as a basis for the claims and for teaching one skilled in the art to variously employ the present invention.

Referring now to the drawings in which like numerals indicate like elements throughout the several views, the drawings illustrate certain of the various aspects of exemplary embodiments of a stabilized conveyor belt with a guided transport chain and interchangeable conveyor plates. The various aspects of the invention are applicable to any of a variety of conveying applications, but for simplicity, the invention is described herein in the context of a packaging machine for loading articles into containers, such as paperboard cartons.

Figure 1:
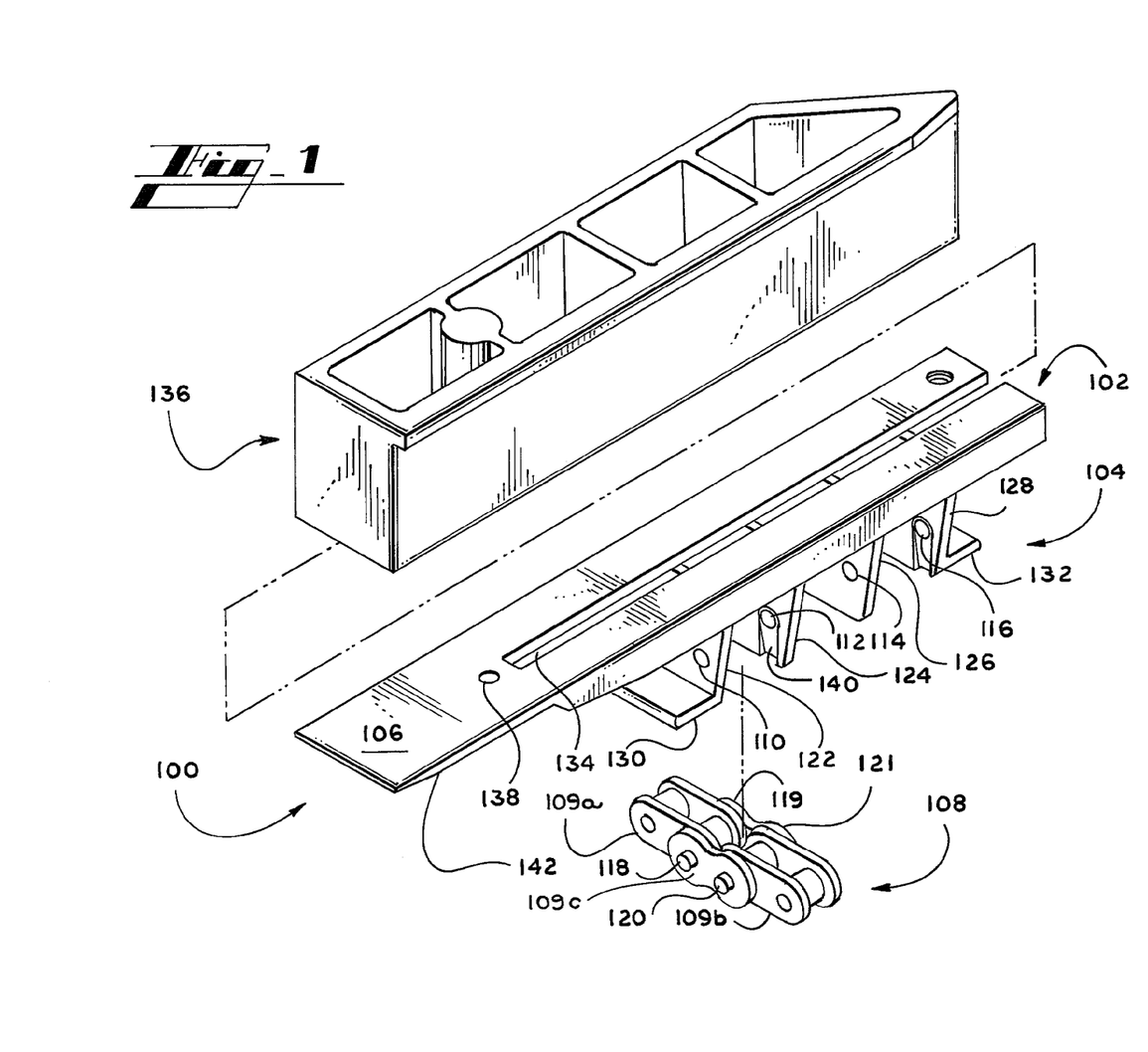
FIG. 1 is an exploded perspective view of a conveyor belt showing an exemplary mounting plate, an exemplary lug member, and an exemplary base chain according to certain of the various embodiments of the invention.

FIG. 1 is an exploded perspective view showing an embodiment of a conveyor plate according to the present invention. The plate shown is of the mounting type, and will hereinafter be referred to as mounting plate 100. Mounting plate 100 is a unitary preformed plastic structure, although it can be fashioned using any system, method, and material for making a plate having the properties and components described herein. Mounting plate 100 includes a body 102, several tabs 104 extending from the underside of the body 102, and a top surface 106, any or all of which are sufficiently deformable as to facilitate attachment to an exemplary transport chain by snapping into place. The exemplary transport chain comprises dual base chains 108 that include a series of chain links, including roller links 109a, 109b that are connected to one another by pin links 109c. Specifically, hinge pins, which connect the plates of the pin links 109c, extend through bushings, which connect the plates of the roller links 109a, 109b, to interconnect the links 109a, 109b, 109c, respectively. Rollers are disposed on each of the bushings of the roller links 109a, 109b. The ends of the hinge pins extend outward from the sides of each of the base chains 108 or otherwise extend outwardly from the plates of the pin links 109c.

Outside tab 122 and central tab 124 straddle one of the base chains 108. Central tab 126 and inside tab 128 straddle the other base chain 108. With a momentary reference also to FIG. 12, each of the tabs snap onto the adjacent base chain 108, being secured by a pair of hinge pins with ends 118, 119, and 120, 121 that protrude or otherwise extend from the sides of each of the base chains 108. The body 102 and/or tabs 104 are deformable to facilitate snapping the mounting plate 100 onto the transport chain, thereby deflecting and then returning to its or their original shape or position after attachment.

Returning now to FIG. 1, those skilled in the art will appreciate that hinge pin ends 118 and 119 may comprise a single continuous pin that passes through the roller link 109a, and hinge pin ends 120 and 121 may comprise a continuous pin that passes through the roller link 109b. The pin ends 120, 121 extend at least partially through apertures or depressions 110, 112 when the mounting plate 100 is attached to base chain 108. Apertures 111, 113, obstructed in the figure, similarly receive hinge pins 118, 119 of base chain 108. A second base chain (not shown) includes identical links and hinge pins that matingly attach to central tab 126 and inside tab 128 via apertures 114, 116. Grooves 140 may be provided to facilitate guiding the hinge pins ends into registry with the respective apertures. Further, stabilizing means such as guides 130, 132 extend perpendicularly from respective outside and inside tabs 122, 128, and a tapered section 142 of the body 102 is provided; all of which function as described below.

The mounting plate 100 includes means for receiving such as a longitudinal groove 134 that is disposed through or countersunk into the body 102 of mounting plate 100 to receive a matching tongue 504 (shown in FIG. 5) portion of an exemplary lug member 136. The groove 134 shown is a T-slot, although any suitable configuration of matching tongue 504 and groove 134 can be substituted. The receiving means also includes a depression 138 formed in or extending through the top surface 106 for receiving a detent 506 (shown in FIG. 5) to detachably lock a lug 136 in place, as will be described in greater detail below.

Figures 2, 3:
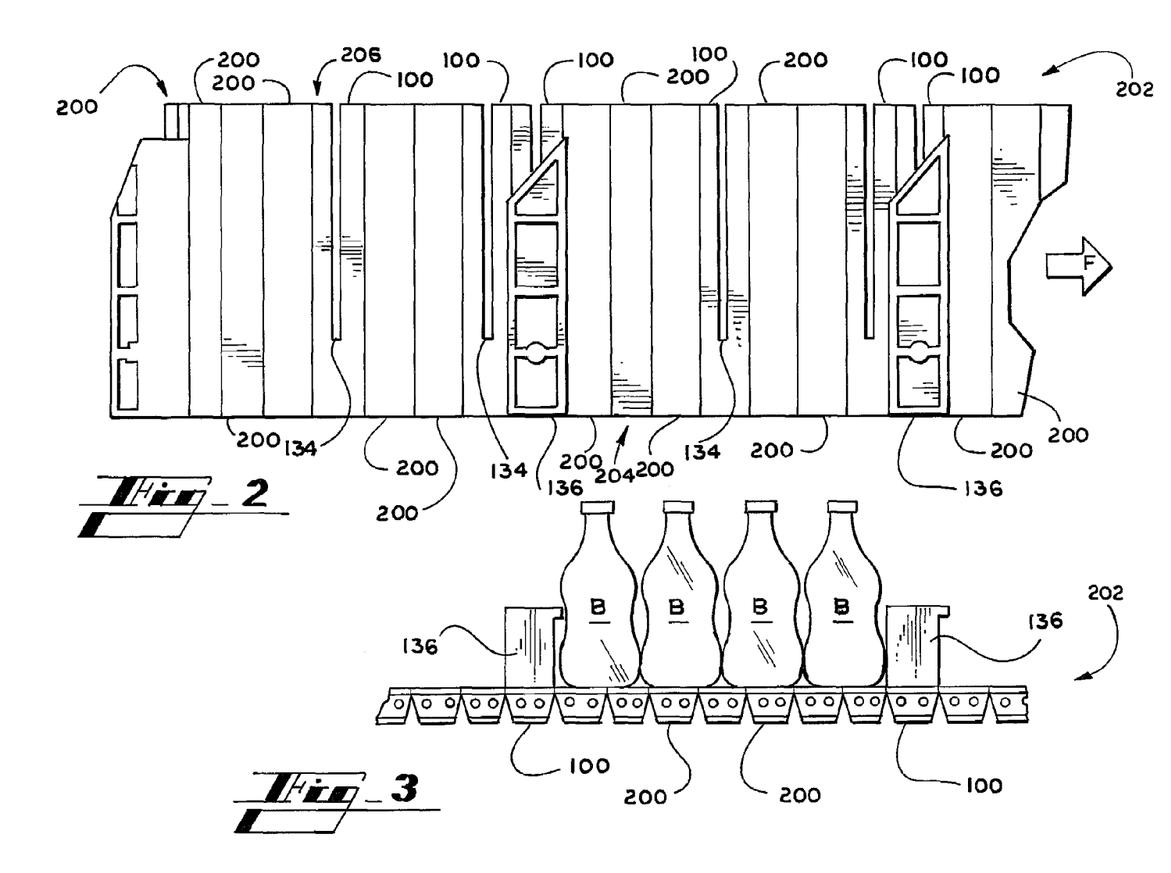
FIG. 2 is a plan view of a segment of an exemplary conveyor belt showing a series of blank plates and mounting plates with lugs attached to certain mounting plates.
FIG. 3 is a side elevation view of a segment of the conveyor belt of FIG. 2, showing bottles disposed on the conveyor belt and grouped by the lugs.

A second type of conveyor plate is contemplated, and is shown in FIG. 2 as blank plate 200. As shown in the figure, the exemplary conveyor belt 202 comprises a series of conveyor plates attached to the transport chain, the series including a preferably regularly repeating pattern of various blank plates 200 and mounting plates 100 with lugs 136 attached to certain mounting plates 100. In sum, each blank plate 200 is identical to each mounting plate 100, except in that the blank plates do not have grooves 134 for receiving tongues 504 or depressions 138 for receiving detents 506. Rather, a blank plate 200 serves as part of the conveyor belt surface, but can not receive a lug 136.

The exemplary conveyor belt 202 has a longitudinal outside edge 206 and a longitudinal inside edge 204, but is continuous, having no end edges. Conveyor belt 202 travels continuously in a direction of flow F, preferably forming a rounded rectangular path having a flat upper surface and rounded ends, although any conveyor configuration is contemplated, including reversible paths, and paths with serpentine or irregularly shaped courses.

FIG. 3 is a side elevation view of a segment of the conveyor belt 202, with articles disposed on the conveyor belt 202. The articles are shown as beverage bottles B, although the conveyor belt 202 could be used to convey any suitable type of article, including various types of foods and beverages in containers such as cans or boxes, as well as other conveyable products. The bottles B are grouped, spaced apart, and/or metered by the grouping lugs 136, which ensure that a predefined number of articles are conveyed into cartons 400 (FIG. 4) or other containers loaded by the packaging machine.

Figures 4, 5, 6:
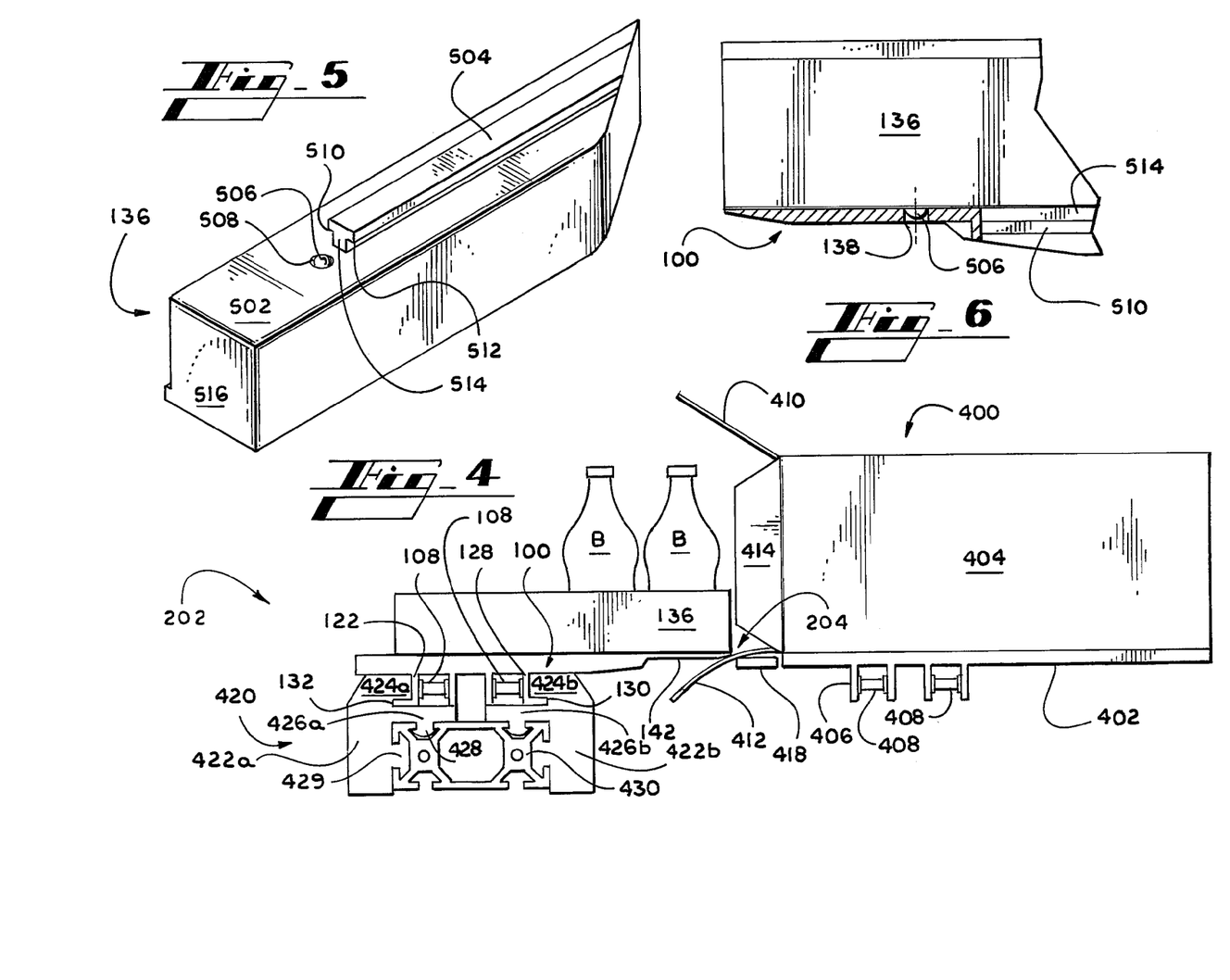
FIG. 4 shows a cross-sectional view of an exemplary rail supporting an exemplary conveyor belt, showing the relationships between the mounting plate of FIG. 1, a lug, a transport chain, a carton conveyor, and the various flaps of a carton.
FIG. 5 is a perspective view showing the underside of the exemplary lug of FIG. 1.
FIG. 6 is a partial cross-section of the lug of FIG. 1 mounted on an exemplary mounting plate, showing an exemplary means for securing the lug on the plate.

FIG. 4 shows a, cross-section of an exemplary conveyor belt 202, showing the functional relationship between the mounting plate 100 of the present invention and other elements and articles associated with a loading station in the packaging machine. The mounting plate 100 is one of a series of plates 100, 200 attached side by side onto the dual base chains 108 of the transport chain. A grouping lug 136 is mounted onto the mounting plate 100. As mentioned above, grouping lug 136 groups, spaces and/or meters several bottles B, which are to be loaded into an exemplary carton 400.

Exemplary carton 400 is formed from a foldable sheet material such as paperboard, corrugated board, plastic, laminates, any combination thereof, or the like. To encourage an understanding of the various aspects of the invention, the construction of carton 400 will only be described only minimally. The foldable sheet material is typically provided as a unitary blank, which is partially assembled to form a collapsed tubular carton. In this collapsed state, the open-ended carton can be fed into the packaging machine, where the carton 400 is partially erected and placed on a carton conveyor, which is described in greater detail below. In the exemplary embodiments, one end of the carton is then sealed. At the loading station, articles such as bottles B are grouped and loaded through the open end of the carton 400, and the end flaps 414 and 416 (not shown) and end flaps 410 and 412 are folded and secured together to form an end closure structure (not shown).

The conveyor belt 202 transports the bottles B in a direction of machine flow F along a container path through the loading station, a portion of which is represented by FIG. 4. The carton conveyor positioned parallel to the container conveyor 202 simultaneously transports cartons 400, each being disposed on its bottom wall (not shown), along a carton path that follows the same direction of machine flow F, where the direction of flow F is normal to the plane of the figure. For example, the carton 400 is placed on the carton conveyor such that its side walls 404 are substantially perpendicular to the direction of machine flow F and top wall (not shown), which is substantially parallel to the direction of machine flow F.

The surface of the carton conveyor is formed of at least one conveyor chain top 402. The conveyor chain tops 402 may be attachments having tabs 406 that are attached to a transport chain comprising base chains 408. To reach the carton 400, the bottles B may have to cross a transition plate 418 that separates the conveyor belt 202 from the carton conveyor. The conveyor belt 202 moves at the same or at a complementary speed as the carton conveyor during the loading process, driven by transport chain (base chains 108).

The conveyor belt 202 is supported and stabilized by a rail 420, which is formed from a smooth material that will impart a relative low degree of kinetic friction to the material from which the plates 100, 200 are constructed. A low coefficient of friction between the materials allows the rail 420 to support and guide the plates 100, 200 as the conveyor belt 202 is driven by the transport chain, without producing drag that would impede the free movement of the conveyor belt 202. In the embodiments described herein, the rail 420 is made of an extruded reinforced plastic material. Those skilled in the art will appreciate that a plethora of known plastic materials, as well as other materials, may offer the performance characteristics required of the rail 420 and related elements. Because the conveyor belt 202 is supported by the rail 420 and not by the base chains 108, the forces generated by the drive are concentrated, via the transport chain, on imparting motion to the conveyor belt 202. Thus, the efficiency of the drive system is increased, and the wear or the components of the conveyor belt 202, base chains 108, and rail 420 is reduced.

To support the conveyor belt 202, the rail 420 includes supports 422a, 422b upon which portions of the underside of the plates 100, 200 rest. More specifically, support 422a supports the outside end of the plates 100, 200 and support 422b supports the inside end of the plates 100, 200. It should be noted that, for the most part, the tapered portion 142 does not contact the rail 420, and rather, overhangs and extends beyond the rail 420 and toward the transition plate 418 and/or the carton conveyor.

Figure 9:
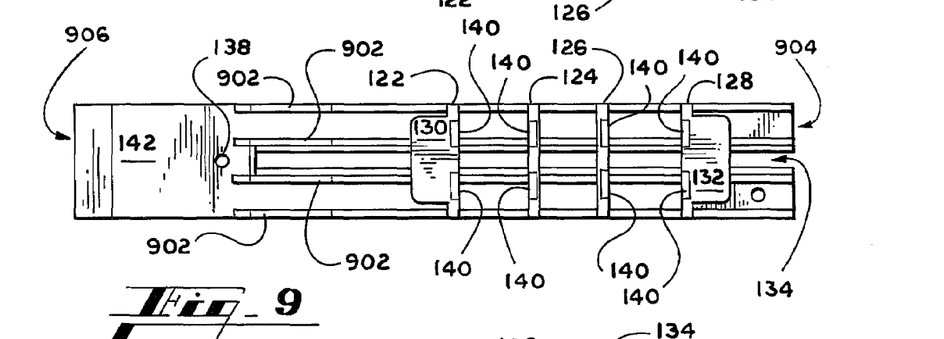
FIG. 9 is a bottom plan view, showing the underside of the mounting plate of FIG. 1.

To stabilize the conveyor belt 202, flanges 424a, 424b extend toward one another and away from supports 422a, 422b so as to engage respective guides 130, 132 and the outside and inside tabs 122, 128. This mating arrangement between the flanges, guides, and tabs eliminates the tendency of the belt to roll from edge to edge or to otherwise twist or buckle. Each guide 130, 132 extends away from the respective outside and inside tab 122, 128 to fit securely underneath the flange 424a, 424b. As is best shown in FIG. 9, each exemplary tab 122, 128 is substantially as wide as the plate 100, and each guide 130, 132 is substantially as wide as the width of the respective tab 122, 128. Although the relative widths may vary in other embodiments, stability about the longitudinal axis of the exemplary plate 100 is improved because the guides 130, 132 are sufficiently wide to engage a significant longitudinal portion of the respective flange 424a, 424b to resist any moment generated by cantilevered forces.

Figure 12:
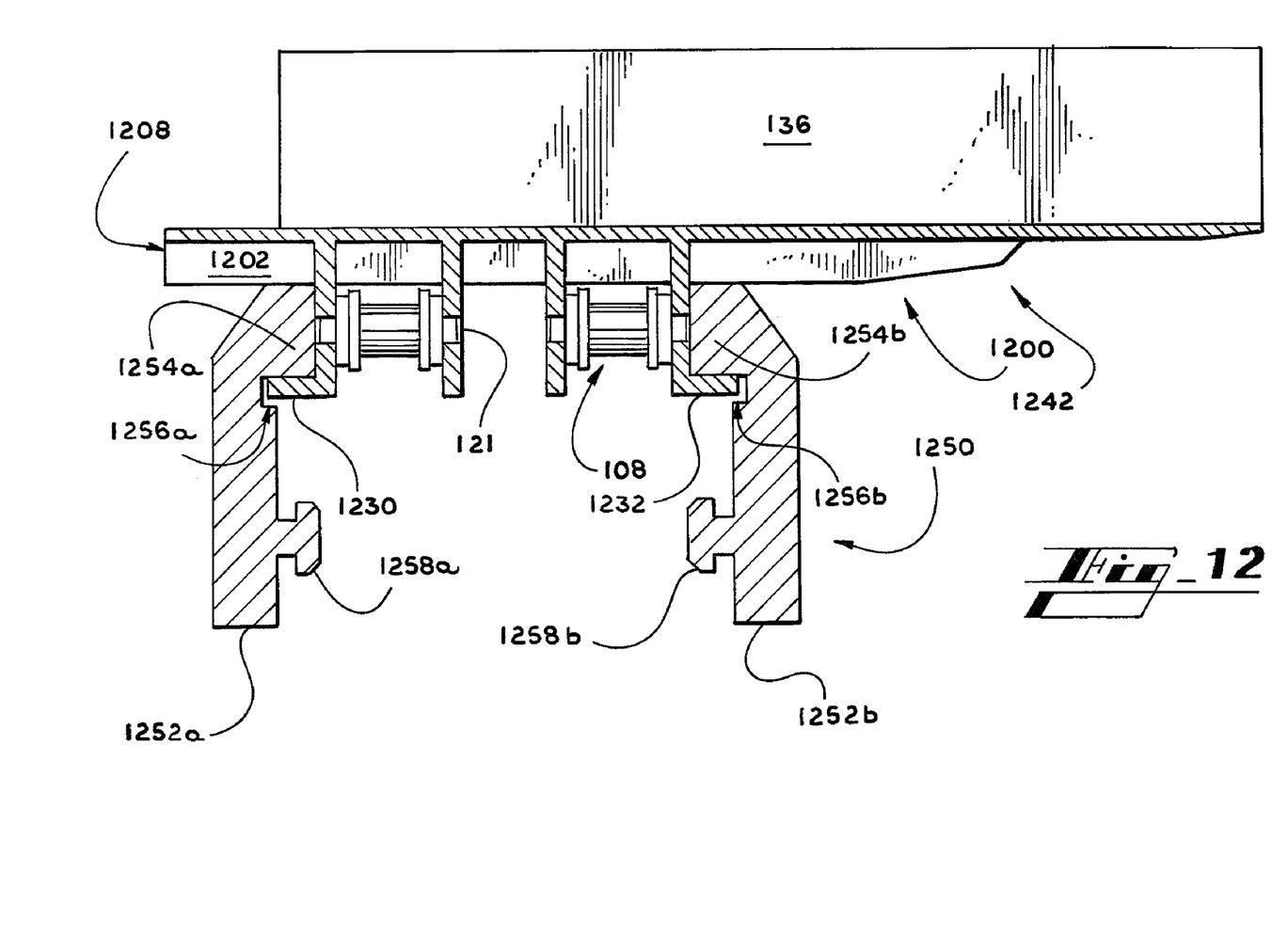
FIG. 12 shows a cross-sectional view of an alternative rail supporting a conveyor belt including an alternative mounting plate having a lug mounted thereon.

Returning to FIG. 4, additional support and guidance for the plates 100, 200 is provided by one or more crossbar portions 426a, 426b of the rail 420. In the embodiment shown, two crossbars 426a, 426b are provided, each supporting and/or guiding the bottom surfaces of the respective guides 130, 132. In alternative embodiments, a single continuous crossbar that extends between supports 422a and 422b is provided, but this arrangement uses more material as the most useful portions of a single crossbar are those disposed directly beneath the guides 130, 132. Referring momentarily to FIG. 12, in another alternative embodiment that is described in greater detail below, ledges 1256a and 1256b support the underside of guides 1230, 1232.

The fit between the tabs, guides, supports, flanges, and crossbars is mating so as to prevent unwanted motion such as buckling and rippling, but there is preferably enough latitude to ensure free movement of the conveyor belt 202 and to prevent seizing. The tabs and guides are flexible enough to yield as needed to seat the conveyor belt 202 in the channel defined by the supports, flanges, and crossbars without flexing so much as to undesirably detach from the transport chain.

The rail 420 is sturdy enough to withstand forces generated by supporting the weight of the bottles B or other products carried on the conveyor belt 202. The rail 420 includes an extruded aluminum core beam 430 that provides support and reinforcement along the length of the conveyor. The core beam 430 includes voids for matingly receiving locking members 428, 429 of the rail 420.

Prior to each carton 400 entering the loading station, the distal end portion of the lower end flap 412 is guided by an end flap guide (not shown) into the position under the plates 100, 200 of the conveyor belt 202 to travel along with the plates 100, 200. This allows the remainder of the lower end flap 412 to be slidably held on and extended across the bridge plate 418 so that the lower end flap 412 is capable of supporting the bottles B that come off of the conveyor belt 202 and guiding them into the carton 400.

At predefined points during the loading process, each group of bottles B is urged off the outside edge 204 of the conveyor belt 202, across the transition plate 418 between the conveyor belt 202 and the carton conveyor, and toward the open end of the carton 400 that is transported on the carton conveyor. The transition plate 418 may include a stationary or mobile element that is disposed between the conveyor belt 202 and the carton conveyor, such as the upper surface of a bridge panel. The transition plate 418 separates the moving parts of the conveyor belt 202 and the carton conveyor, and provides an upper surface for supporting the end flap 412 of each carton while the bottles B are urged into the carton 400 and slide across the end flap 412, thereby traveling across the transition plate 418. The transition plate 418 also guides the end flap 412 so that the distal end portion of the end flap 412 is placed under the tapered portion 142 of the plates 100, 200 while each carton moves through the loading station. In other words, at the loading station, end flap 412 extends across the transition plate 418, its distal end being disposed beneath the conveyor belt 202. Thus, the maximum width of the transition plate 418 is substantially equal to the distance between the carton conveyor and the upper surface 106 of plates 100, 200 comprising conveyor belt 202.

As previously mentioned, the present invention encompasses means for securing the lug 136 on the mounting plate 100. In the exemplary embodiments, mounting plate 100 includes a groove 134 that is configured to receive the exemplary grouping lug 136. FIG. 5 shows the underside of grouping lug 136, which includes a tongue 504 having a cross-sectional shape and dimensions that correspond to the shape and dimensions of the groove 134, so as to create an interlocking joint therebetween. The exemplary tongue 504 has a shape that is similar to an uppercase letter T, and the groove 134 has a shape that is similar to an inverted uppercase letter T, although any corresponding shapes could be used, including but not limited to, the mortise and tenon shape of a dovetail joint. The lug 136 is detachably locked into place via a detent assembly including a spring-loaded detent pin or ball 506 that is housed in recess 508. The detent pin 506 corresponds to the aperture or depression 138 in the mounting plate 100.

The tongue 504 includes a stem 514 that is narrower than the uppermost portion of groove 134, and two flanges 510 and 512 that are captured by legs 1106 (shown in FIG. 11) of the groove 134. The height of the stem is at least as great as the thickness of the legs 1106, and the thickness of the flanges 510, 512 is no greater than the height of the side walls 1102 (shown in FIG. 11) of the groove 134. To mount lug 136 as shown in the cross-section view of FIG. 6, flanges 510, 512 are trapped beneath legs 1106 while sliding the outside end 516 of the lug 136 toward the tapered end of the mounting plate 100. When the detent pin 506 is in registry with depression or aperture 138, the lug 136 locks into place.

Figure 7:
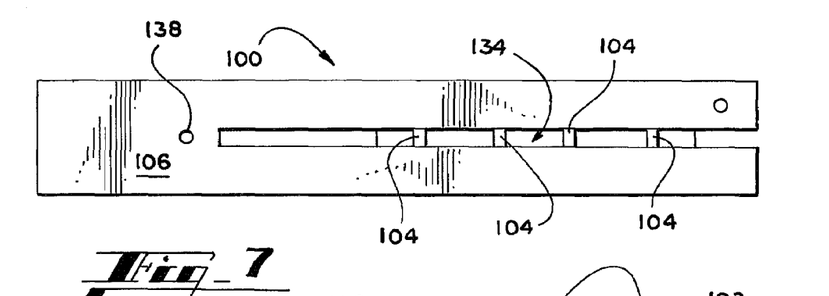
FIG. 7 is a plan view of the upper surface of the mounting plate of FIG. 1.
Figure 8:
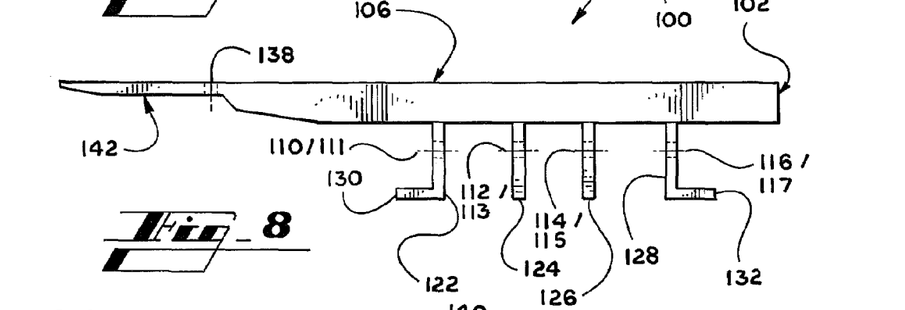
FIG. 8 is a side elevation view of the mounting plate of FIG. 1.

As FIG. 7 shows, portions of the groove 134 may extend completely through the body 102, creating a gap that reveals upper edges of the tabs 104 that extend from the underside of the mounting plate 100. Alternatively, the groove 134 may be only a longitudinal trench having a bottom surface 1104 (FIG. 11), or a combination of a gap and a trench. Referring to FIGS. 8 and 9, in the embodiments shown, the aperture 138 extends completely through the body 102 as well, although a depression sufficient to detachably engage the detent pin 506 can be used instead. Whether an aperture or depression, element 138 can have any shape that corresponds to the shape and dimensions of the detent pin 506.

Figures 10, 11:
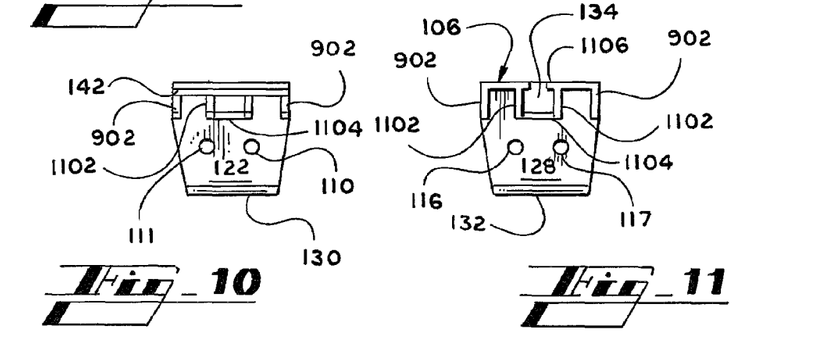
FIG. 10 is an end elevation view, showing the tapered end of the mounting plate of FIG. 1.
FIG. 11 is an end elevation view, showing the blunt end of the mounting plate of FIG. 1.

Referring now to FIG. 9, the underside of the body 102 of mounting plate 100 and blank plate 200 may include longitudinal ribs 902 that extend from the inside end 904 of the plate 100, 200 and terminate prior to reaching the outside edge 906. Preferably, the ribs 902 do not extend onto the tapered portion 142 of the plate 100, 200 so as not to interfere with the passage of the lower end flaps 412 of the cartons 400. The ribs 902 increase the longitudinal strength of the plate 100, 200, countering any tendency to bow or arch along the length of plate 100, 200 due to irregular load distributions that may occur as articles are urged off of or onto the edges 204, 206 of the conveyor belt 202. The ribs 902 provide a favorable alternative to achieving the necessary strength by increasing the overall thickness of the plate 100, 200, which would consume more material and increase the weight of the plate 100, 200. As shown in FIGS. 10 and 11, the innermost ribs 902 may also function as side walls 1102 of at least a portion of the groove 134.

FIGS. 10 and 11 make apparent that in the exemplary embodiments, the apertures 110, 111, 112, 113, 114, 115, 116, 117 extend through the respective tabs 122, 124, 126, 128. In alternative embodiments, depressions for receiving hinge pin ends 118, 119, 120, 121 are provided, the depressions extending only partially through the respective tabs 122, 124, 126, 128.

FIG. 12 shows a cross-sectional view of an alternative rail 1250 supporting a conveyor belt including an alternative mounting plate 1200 having a grouping lug 136 mounted thereon. The mounting plate 1200 differs from the mounting plate of FIGS. 1 through 11 in that the thickness of the body 1208 at the side edges is comparatively reduced. The groove 1234 (not shown) is defined in part by side walls 1202 and may or may not have a bottom surface. In certain versions of this embodiment, longitudinal ribs (not shown) are also included.

Notably, the rail 1250 includes supports 1252a, 1252b and flanges 1254a, 1254b, but does not include crossbars. Rather, notches are removed from supports 1252a, 1252b below the flanges 1254a, 1254b, thereby defining ledges 1256a, 1256b, which support the respective tabs 1230, 1232. Locking members 1258a, 1258b are also provided to secure the rail 1250 to an inner core beam (not shown).

It should be noted that the transport chain, as described herein, may be any continuous drive system to which a conveyor plate may be attached to form a conveyor belt. For example, the transport chain may include all types of chain that is known or yet to be invented, chain with attachment links, belts, and the like. In addition, means for mounting the conveyor plate to the transport chain is not limited to tabs which attach to hinge pins extending from base chains. It is considered that the tabs may be adapted such that they attach to the plates of the links of the transport chain.

The present invention has been illustrated in relation to a particular embodiment, which is intended in all respects to be illustrative rather than restrictive. Those skilled in the art will recognize that the present invention is capable of many variations and combinations without departing from the scope of the claims appended hereto and supported by the foregoing.

Those skilled in the art will also appreciate that the packaging machine described represents only one example of the various packaging machine types and configurations that will be suitable for implementation of the various embodiments of the invention. Furthermore, the advantages of the invention can be realized in any conveying application or process, without limitation to the packaging arts.

What is claimed is:

1. A conveying system, comprising:
a conveyor belt, comprising:
an articulated transport chain for driving the conveyor belt, the transport chain comprising a plurality of base chains, wherein each of the plurality of base chains includes a series of chain links joined together; and
a plurality of plates disposed in a side by side arrangement to define a conveyor surface for carrying articles, each plate being independently and detachably attached to each of the plurality of base chains; and
at least one member attached to a respective one of the plurality of plates so as to extend outwardly from the conveyor surface.

2. The conveying system of claim 1, wherein the plurality of base chains comprises:
a first base chain; and
a second base chain.

3. The conveying system of claim 2, wherein:
each of the series of chain links is joined to another by hinge pins having ends that extend outward on at least one of the sides of the chain link; and
each of the plurality of plates is attached to at least one of the extended hinge pin ends on the first base chain, and to at least one of the extended hinge pin ends on the second base chain.

4. The conveying system of claim 1, wherein:
the plurality of chain links is joined together by hinge pins having ends that extend outward on at least one side with respect to the chain links; and
each of the plurality of plates includes a set of spaced apart tabs for engaging the extended hinge pin ends.

5. The conveying system of claim 4, further comprising a fixed rail for guiding the conveyor belt along a predefined path;
wherein the conveyor belt further comprises means for stabilizing each of the plurality of conveyor plates, the stabilizing means stabilizing the conveyor belt by limiting the movement of the conveyor belt with respect to the fixed rail.

6. The conveying system of claim 5, wherein the set of tabs comprises an inside tab and an outside tab, and the stabilizing means comprises a guide extending at an angle from both the inside tab and the outside tab, the guide being for engaging a flange extending from the fixed rail.

7. The conveying system of claim 1, the conveyor belt being for use in a packaging machine.

8. The conveying system of claim 1, wherein each of the plurality of plates is formed from injection molded plastic.

9. The conveying system of claim 1, further comprising means for mounting each of the plurality of plates to the transport chain.

10. The conveying system of claim 9, wherein means for mounting comprises:
an inside tab for engaging a first one of the plurality of base chains; and
an outside tab for engaging a second one of the plurality of base chains.

11. The conveying system of claim 10, wherein means for mounting further comprises:
at least one central tab positioned between the inside tab and the outside tab, the at least one central tab being for engaging at least said first one of the plurality of base chains.

12. The conveying system of claim 1, wherein:
the at least one member and the respective one of the plurality of plates are configured to be detachably connected to one another.

13. The conveying system of claim 12, wherein the at least one member is for maintaining separation between groups of articles that are carried on the conveyor surface.

14. The conveying system of claim 12, wherein:
the respective one of the plurality of plates comprises a body defining a substantially flat top surface that constitutes part of the conveyor surface;
an elongate groove is formed in the top surface, the groove defining an opening that extends at least partially through the body, the member comprising an elongate tongue, the groove being for matingly receiving the elongate tongue.

15. The conveying system of claim 14, wherein the opening is relatively most narrow at the top surface.

16. The conveying system of claim 14, wherein the cross-sectional shape of the groove is selected from a group consisting of: an uppercase letter T; a wedge; an uppercase letter L; a lowercase letter t.

17. The conveying system of claim 14, wherein the opening includes at least one projection extending from one of the sides of the opening;
wherein the at least one projection is for engaging the elongate tongue of the member.

18. The conveying system of claim 14, the receiving means further comprising a depression for releasably locking the member in the elongate groove.

19. A conveying system, comprising:
a conveyor belt, comprising:
a plurality of base chains;
a plurality of plates disposed in a side by side arrangement to define a conveyor surface for carrying articles, each plate being attached to each of the plurality of base chains each of the plurality of plates comprising:
a first section being configured to increase the longitudinal strength of the plate; and
a second section being configured to receive an end flap of a carton under the plate.

20. The conveying system of claim 19, wherein the first section comprises at least one longitudinally extending rib.

21. The conveying system of claim 19, wherein the second section is tapered.

22. A conveying system, comprising:
a conveyor belt, comprising:
an articulated transport chain for driving the conveyor belt, the transport chain comprising a plurality of base chains, wherein each of the plurality of base chains includes a series of chain links joined together; and
a plurality of unitary plates disposed in a side by side arrangement to define a conveyor surface for carrying articles, each plate being independently and detachably attached to each of the plurality of base chains, each of the plurality of plates comprising:
a body defining a substantially flat top surface that constitutes part of the conveyor surface, the body comprising:
a first section; and
a second section having an average thickness that is substantially less than the average thickness of the first section, wherein the second section tapers away from the first section; and
a carton conveyor for carrying cartons alongside the conveyor belt;
wherein the tapered second section of each of the plurality of plates is for holding a portion of a carton on the carton conveyor under the body.

* * * * *